United States Patent [19]

Andersen

[11] 3,927,294
[45] Dec. 16, 1975

[54] WELDING METAL GRATING ENDS
[75] Inventor: Peder John Andersen, Brookvale, Australia
[73] Assignee: P.M. Andersen Manufacturing Pty. Limited, Brookvale, Australia
[22] Filed: Mar. 6, 1974
[21] Appl. No.: 448,512

[30] Foreign Application Priority Data
  Mar. 8, 1973  Australia............................ 2516/73

[52] U.S. Cl................................. 219/107; 219/58
[51] Int. Cl.². ........................................ B23K 11/02
[58] Field of Search ......... 219/56, 57, 58, 104, 107, 219/101

[56] References Cited
UNITED STATES PATENTS
| | | | |
|---|---|---|---|
| 1,311,789 | 7/1919 | Abbott............................... | 219/101 |
| 2,179,803 | 11/1939 | Sykes............................. | 219/107 X |
| 2,384,303 | 9/1945 | Heath ............................. | 219/58 X |
| 3,056,883 | 10/1962 | Eisenburger et al............ | 219/107 X |

Primary Examiner—J. V. Truhe
Assistant Examiner—N. D. Herkamp
Attorney, Agent, or Firm—Oldham & Oldham Co.

[57] ABSTRACT

A method of welding a transverse end bar to the ends of longitudinal members of a metal grating which comprises clamping the longitudinal members near one end of the grating, positioning the end bar against a clamped end of the longitudinal members, progressively welding the end bar to respective ends by a resistance welding process wherein each bar is successively clamped between the copper blocks of one electrode and the end bar is driven into firm welding contact by the other electrode while an electrical current effects a resistance weld, the end bar having projecting welding beads on one face which collapse upon welding thereby bending the end bar, but the end bar being progressively straightened as the subsequent welds take place.

11 Claims, 11 Drawing Figures

WELDING METAL GRATING ENDS

CROSS-REFERENCE TO RELATED APPLICATION

This application is related to application Ser. No. 464,160, filed Apr. 25, 1974.

BRIEF SUMMARY OF THE INVENTION

Briefly the invention comprises a method wherein the longitudinal members of a metal grating are clamped near their one end, an end bar is positioned adjacent that end, a first electrode is placed into firm contact with a longitudinal member near its clamp end and a second electrode against the end bar to bring it into welding contact with the end of that longitudinal member, the electrodes being respectively connected to the secondary terminals of the welding transformer which is then energised to effect the weld, and after that weld has been effected the electrodes are progressed to progressive welding localities, effecting welds as they progress. The end bar is provided with welding beads or projections extending along it, this having the effect of providing a satisfactory heat balance between the elements to be welded. However, in the effecting of the weld, the welding beads collapse and this results in a bending of the end bar at the welding locality. Since the welds take place progressively across the end bar, the previously formed bend in the end bar is straightened as the next weld takes place, and the invention therefore makes possible the welding of an end bar which, after having been welded, is substantially straight. It has been previously thought that this could be achieved only by effecting all the welds simultaneously, and this is not practical because of the large power consumption when there are a very large number of welds to be effected, as for example on the ends of the longitudinal members of the metal grating.

More specifically, a method of welding a transverse end bar to the ends of longitudinal members of a metal grating comprises the steps:

a. clamping the longitudinal members near one end of the grating against a grating support surface on a first frame, b. positioning the end bar adjacent the clamped ends of the longitudinal members, c. positioning a first electrode at a first welding locality into firm contact engagement with a said longitudinal member near its clamped end, said electrode having a first conductor connecting it with a first secondary terminal of a transformer, d. driving a second electrode against the end bar to bring it into firm welding contact with the end of said contacted longitudinal member, the second electrode having a second conductor connecting it with a second secondary terminal of said transformer, said electrodes and transformer being carried on a second frame, e. energising said transformer to effect a resistance weld between the end of said contacted member and said end bar, f. releasing the electrodes respectively from engagement with the then welded longitudinal member and end bar, and g. effecting relative movement between said frames to position the electrodes at a second welding locality, similarly effecting a resistance weld at the second welding locality and repeating until welds have been effected at all welding localities.

BRIEF DESCRIPTION OF THE DRAWINGS

An embodiment of the invention is described hereunder in some detail with reference to and is illustrated in the accompanying drawings in which.

Figure 1:
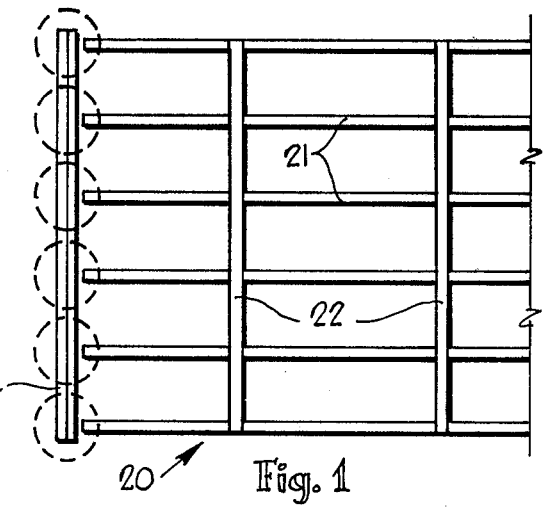
FIG. 1 is a plan view of a metal grating, showing an end bar in position for welding thereto, and showing also the weld localities.

Referring first to FIG. 1, a metal grating 20 comprises a plurality of longitudinal members 21 interconnected intermediate their ends by transverse members 22 resistance welded thereto, in accordance with known art in the construction of steel grating.

Figure 5:
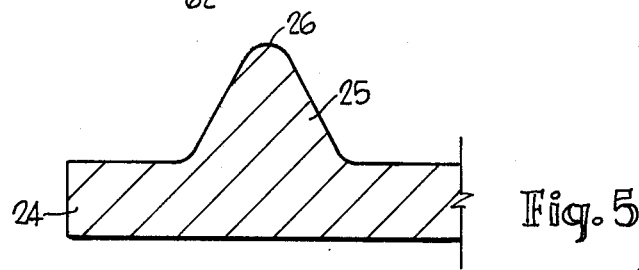
FIG. 5 is an enlarged section through one of the welding beads of the end bar.

An end bar 24 is of constant cross-sectional shape being provided with a pair of spaced beads 25 extending for their length, the configuration of each bead 25 being illustrated in enlarged scale in FIG. 5. It will be noted that the welding beads 25 having sloping side faces (in this embodiment subtending an angle of 54°) the contacting edge designated 26 being curved. This cross-section enables the welding bead 25 to be progressively heated during the weld operation, this progressive heating assisting in achieving a satisfactory degree of heat balance to achieve a satisfactory weld.

Figure 6:
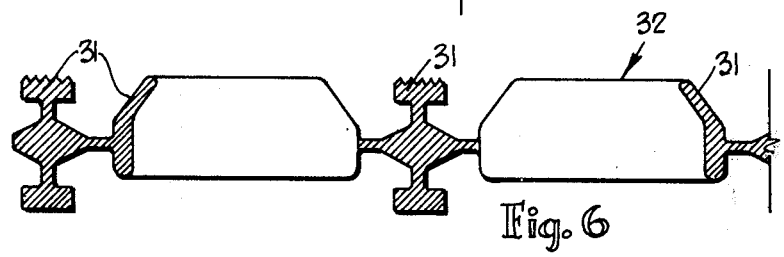
FIG. 6 is a section through an aluminium grating showing an alternative configuration, the aluminium grating being of the expanded type.
Figure 7:
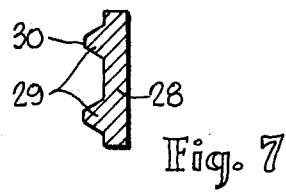
FIG. 7 is a section of an aluminium end bar which is useful for welding to the ends of the longitudinal members of the grating of FIG. 6.

FIGS. 6 and 7 indicate one shape which can be utilised in the welding of aluminium gratings, the end bar designated 28 in FIG. 7 having welding beads 29 extending along one face, the side edges of the welding beads 29 again sloping and converging away from the main body of the bar 28, but terminating in flat surfaces designated 30. The efficiency of this method is such that in many instances it is not necessary to remove the oxide film from the surfaces 30, but since the surfaces are flat, removal of the oxide film is quickly and easily achieved in those instances where it is necessary. As shown in FIG. 6, a wide range of welding conditions is encountered in certain instances in expanded aluminium, and the longitudinal members designated 31 of the aluminium grating 32 will be seen to vary in cross-sectional thickness. FIG. 6 therefore illustrates the difficult conditions likely to be encountered, and without the method of this invention resistance welding of aluminium would be most difficult to achieve. One of the advantages of this invention is that it results in better welding conditions.

Figure 2:
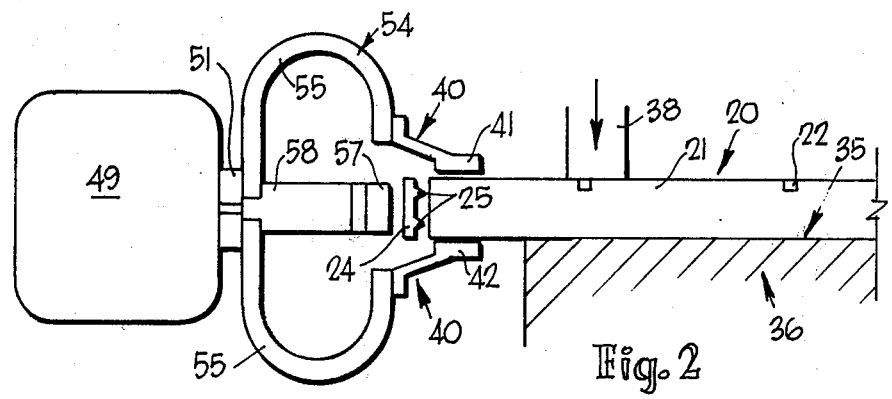
FIG. 2 is a diagrammatic section illustrating the metal grating having its longitudinal members clamped near one end thereof, and having the end bar adjacent the clamp ends but the electrodes not in contact with the material to be welded.
Figure 9:
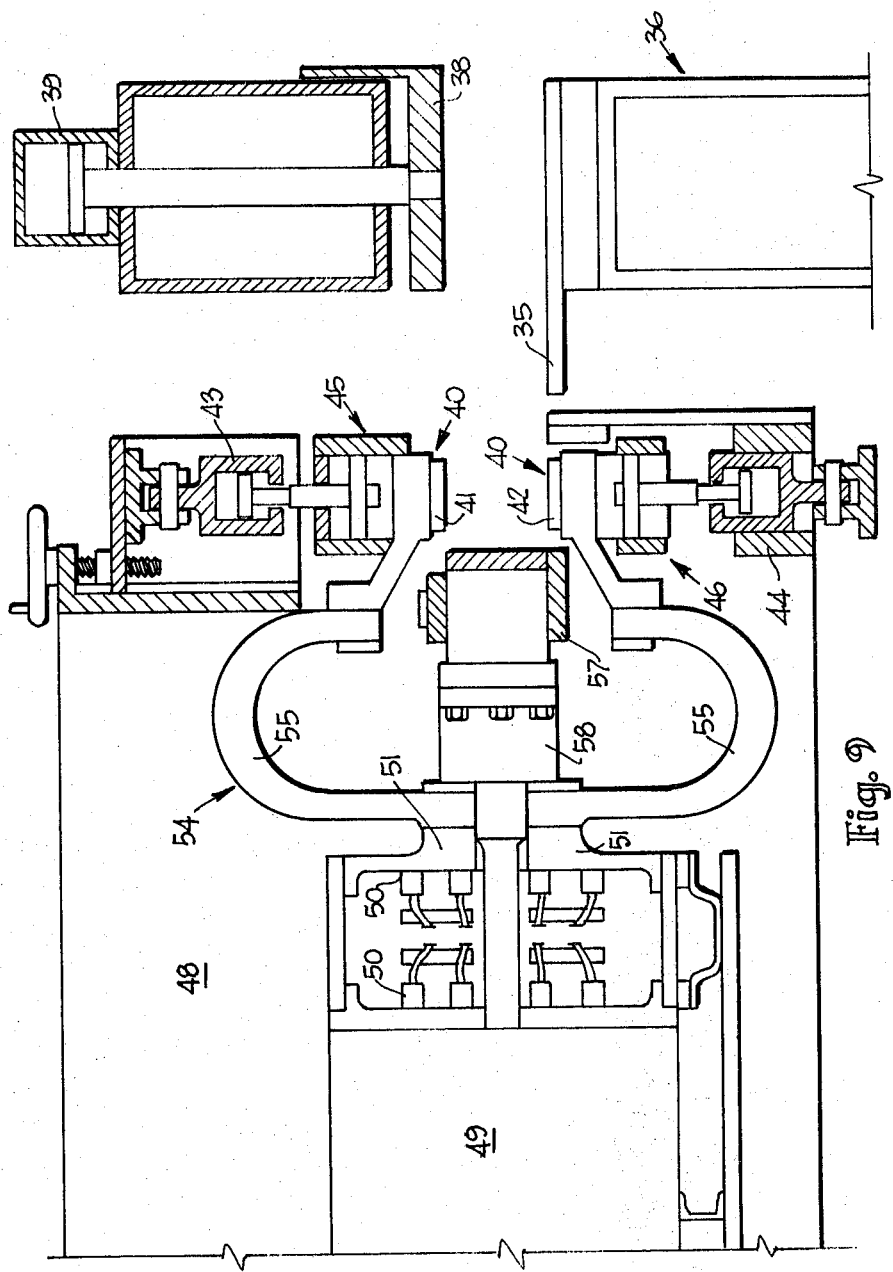
FIG. 9 is a fragmentary section which illustrates the mechanical details of the welding head of the machine.

Referring again to FIGS. 2, 3 and 4 it will be seen that the metal grating 20 is supported on a grating support surface 35 of a first frame 36. Actual constructional details of this can be seen from FIGS. 9 and 10. A series of clamps 38 are driven by fluid actuated cylinders 39 to firmly clamp the metal grating 20 onto the surface 35.

A first electrode is designated 40 and comprises two copper alloy blocks 41 and 42 (see particularly FIG. 9), these copper alloy blocks respectively being coupled to clamping cylinders 43 and 44, and guided for movement by means of guides 45 and 46. These cylinders and guides are carried on a second frame designated 48, itself supported by rollers so that it becomes a carriage, the second frame 48 also supporting a welding transformer 49. In this embodiment the welding transformer 49 is a three transformer and rectifies the transformed current by means of diodes 50 which connect to the output pads, herein called the "secondary terminals" 51, of the transformer. A conductor which is generally designated 54 joins the first electrode 40 to one of the secondary terminals 51. The conductor 54 comprises a pair of identical jumper leads 55 laminated from copper shim, the jumper leads 55 extending respectively above and below the medial horizontal plane of the end bar, being of equal resistance and being symmetrical with respect to the medial plane.

Figure 3:
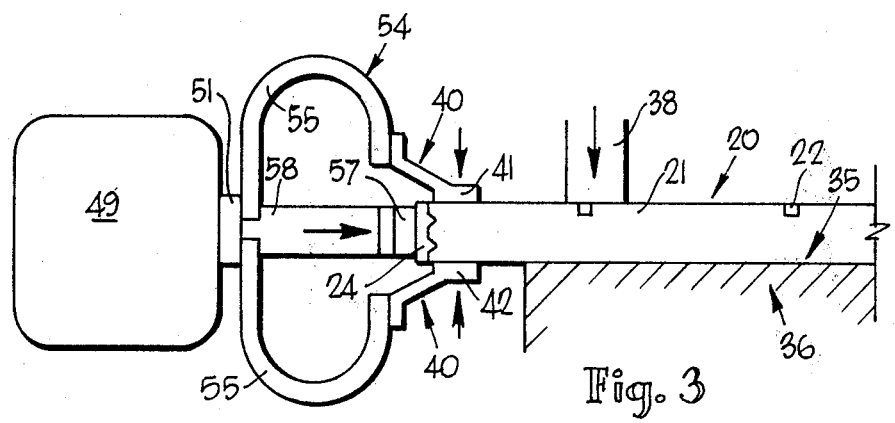
FIG. 3 is a diagrammatic section similar to FIG. 2 but showing the weld being effected by clamping a longitudinal member between two portions of the first electrode and driving a second electrode against the end bar.

The second electrode is designated 57, and as shown in FIG. 3 is driven against the end bar 24 to bring it into firm welding contact with the end of that longitudinal member which is contacted by the first electrode 40, the second electrode 57 having a second conductor 58 (also a jumper lead) connecting it with the other secondary terminal 51 of the transformer 49. The conductor 58 lies in the medial horizontal plane which is also the medial horizontal plane of the end bar, and the jumper lead 58 defines with the jumper leads 54 and 55 two secondary loops of equal impedance, that is of equal reactance as well as of equal resistance. Thus, although this invention is described with respect to direct current resistance welding, it will be seen that it also is applicable to alternating current resistance welding.

Figure 11:
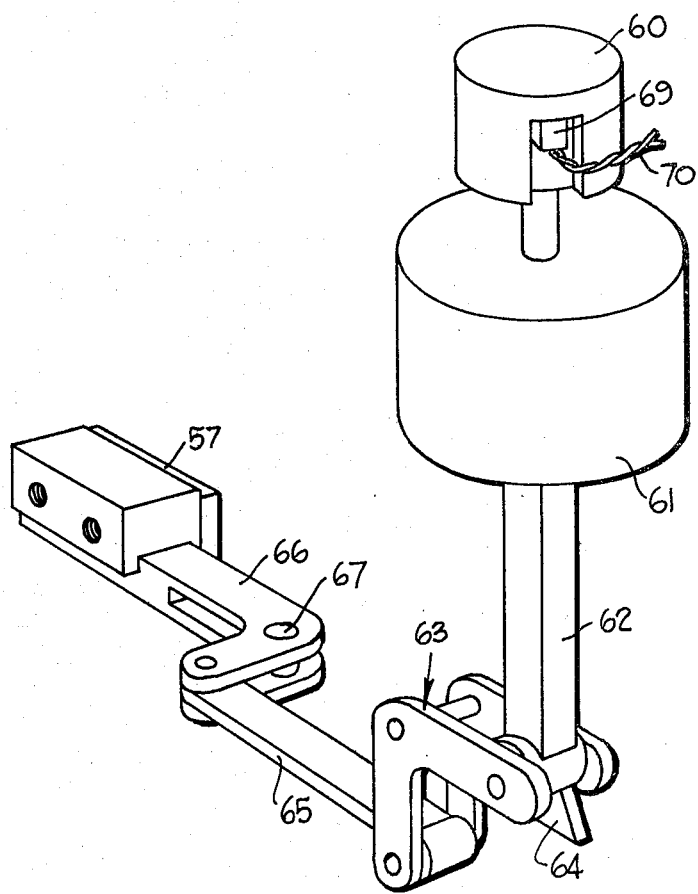
FIG. 11 is a fragmentary perspective view which shows diagrammatically the mechanism used for driving the second electrode against the end bar to bring it into welding contact with the end of a contacted longitudinal member of the metal grating.

In order to effect the required welding pressure, it is seen that the transformer 49 prohibits use of the usual arrangement of a cylinder aligned with an electrode. FIG. 11 illustrates the arrangement used wherein a fluid actuated welding cylinder 60 is linked to an air bag 61 (the air bag being of the low inertia type and manufactured by Taylor Winfield Corporation, of Warren, Ohio, U.S.A., and sold under the Trade Mark "SEAL-OFF") in turn coupled by a thrust rod 62 to a first bell crank 63 which is hinged to a bracket 64 carried on the second frame 48, a second link 65 coupling the bell crank 63 to a second bell crank 66 which is pivotal about an upstanding pin 67 also carried on the second frame 48, the bell crank 66 carrying the second electrode 57 thereon. The existence of welding pressure is sensed by means of a load cell 69 of the solid state type, coupled by leads 70 to a control circuit to initiate the weld sequence.

The weld sequence is in accordance with known prior art, and in this embodiment provision is made for use of the following stages:
 a. squeeze,
 b. preheat,
 c. upslope-weld heat,
 d. downslope-post heat,
 e. quench
 f. temper, (heat)
 g. hold.

Figure 4:
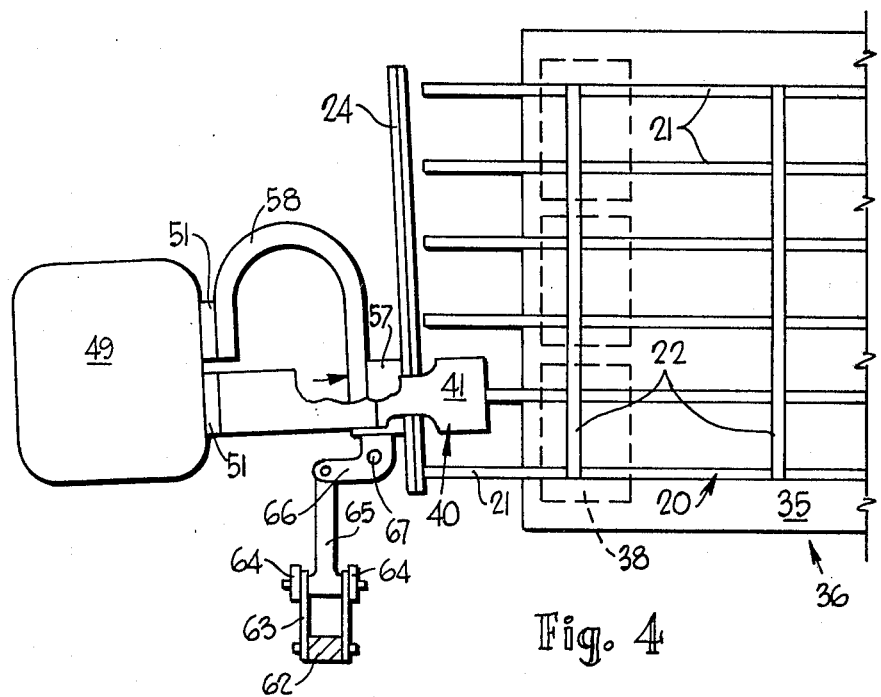
FIG. 4 is a plan view similar to FIG. 1 but showing the condition of the end bar after two welds have taken place and also showing the jumper lead arrangement of the welding transformer.

After the weld has taken place, the electrodes are released and the second frame 48, which is a carriage, is driven by means of a hydraulic motor and drive means (not herein shown) to the next welding stage. It should be noted that after two welds have taken place the end bar 24 will have been bent outwardly as illustrated in FIG. 4, but as each weld takes place the bar is progressively straightened from its previous bend and a further bend introduced. It might also be noted that the hinging action of the second electrode 57 is of value in achieving the straightening action of the end bar.

Figure 8:
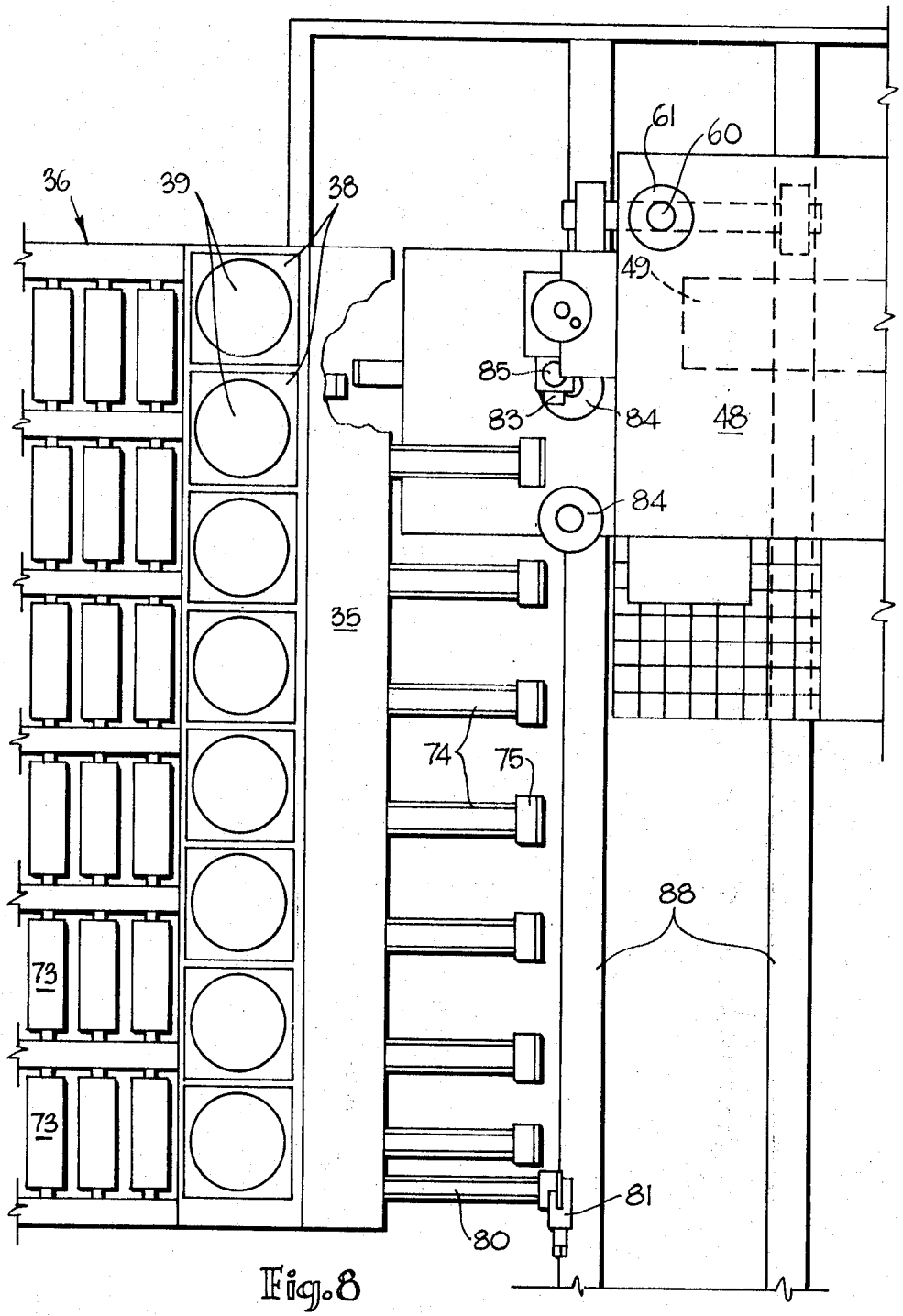
FIG. 8 is a diagrammatic plan of a machine used in the method of this invention for the welding of an end bar to the longitudinal members of a metal grating.
Figure 10:
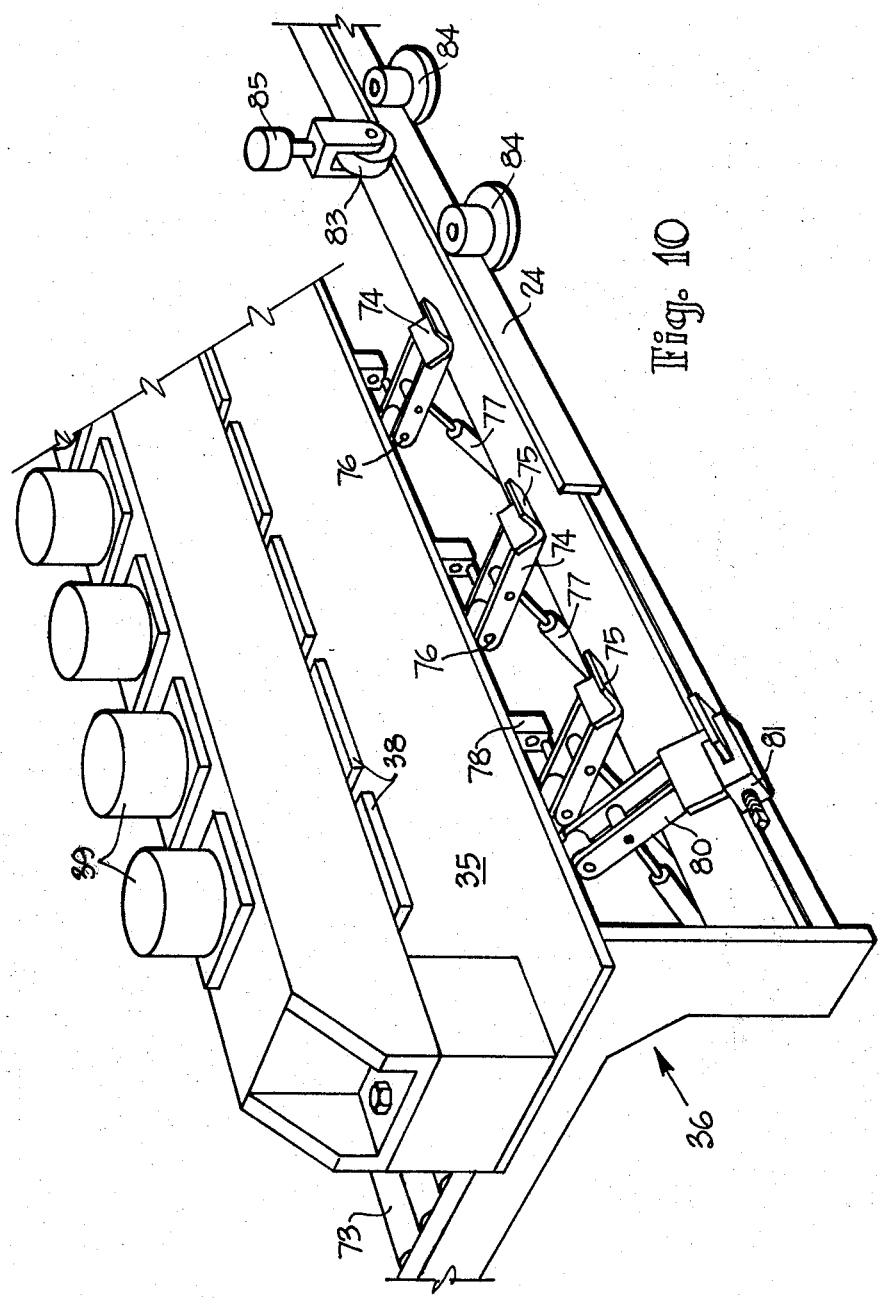
FIG. 10 is a fragmentary perspective view which illustrates the stop bars used for locating the ends of the longitudinal members of a metal grating and which also illustrates the locating means used for locating the end bar.

Referring now to FIGS. 8 and 10, it will be seen that the first frame 36 is provided with a series of roll cases 73 to facilitate loading of the metal grating 20. The forward movement of the metal grating 20 is arrested by means of stop bars designated 74 of which there are a number along the length of the machine, each stop bar 74 having upstanding lips 75, and being hinged at its inner end 76 to the first frame 36. Raising and lowering is effected by means of fluid actuated cylinders 77, and use is made of proximity detectors 78 which inhibit carriage travel if the respective stop bars 74 are not retracted.

The end of the end bar is located by an end bar locating member 80, similarly retractable, but provided with a spring loaded block 81 which enables some endwise movement of the end bar.

As shown particularly in FIG. 10, the end bar 24 is located at its other end between rollers designated 83 and 84, there being a single roller 83 which applies a downward pressure by means of a fluid actuated cylinder 85 against the flanges of two rollers 84 which have vertical axes of rotation. This arrangement has the advantage of firmly retaining the end bar in position but allowing it to move the small amount in a lateral direction required to effect a weld.

Accurate location of the welding head with respect to successive longitudinal members 21 is achieved by means of proximity detectors which are not however herein illustrated. The machine is also provided with means to limit reverse movement of the carriage 48 (the second frame) so that unnecessary movement beyond the edge of a narrow mat is avoided. This means is electrically interlocked with the stop bars 74 so that these are not unnecessarily raised. This arrangement is not illustrated herein.

FIG. 8 also shows the carriage tracks designated 88 on which the carriage 48 is guided for movement along the grating end.

The length of the end bar exceeds the width of the grating to which it is welded, and it will be seen that at any time after the first two initial welds have taken place the locating member 80 may be retracted, but retraction does not take place until most of the welds have taken place, and the carriage interacts with an air valve on the first frame. After all welds have been completed, the projecting ends of the end bar are docked in accordance with known art.

A consideration of the above embodiment will indicate that the welding conditions for both the welding beads are maintained identical, that the advantage of quick followup and heat balance can be achieved, that the end bar distortion is corrected during the weld, and that by use of standard electrical interlock circuits the machine may be made automatic, therefore welding at relatively high speed and being suitable for production line operation.

I claim:

1. A method of welding a transverse end bar to the ends of longitudinal members of a metal grating, wherein the transverse end bar comprises two welding beads, comprising the steps:
   a. clamping the longitudinal members near one end of the grating against a grating support surface on a first frame,
   b. positioning the end bar welding beads adjacent the clamped ends of the longitudinal members,
   c. positioning a first electrode comprising two copper alloy blocks at a first welding locality into firm contact engagement with a said longitudinal member near its clamped end, said blocks having respective flexible jumper leads of equal length and resistance positioned respectively above and below the medial horizontal plane of the end bar connecting said blocks with a first secondary terminal of a transformer,
   d. driving a second electrode against the end bar to bring it into firm welding contact with the end of said contacted longitudinal member, the second electrode having a flexible jumper lead lying in said medial horizontal plane and connecting it with a second secondary terminal of said transformer, said jumper leads between them defining two secondary loops of equal impedance, said electrodes and transformer being carried on a second frame,
   e. energizing said transformer to effect resistance welds between the end of that said contacted member only and respective said welding beads of said end bar, while at the same time collapsing the weld metal,
   f. releasing the electrodes respectively from engagement with the then welded longitudinal member and end bar, and
   g. effecting relative movement between said frames to position the electrodes at a second welding locality, similarly effecting a resistance weld at the second welding locality and straightening any bend in the end bar caused by collapse of weld metal during the previous weld, and repeating until all welds have been effected, by welding the end bar to the longitudinal members one at a time.

2. A method according to claim 1 wherein said two copper alloy blocks of the first electrode are each carried on the movable element of a respective fluid actuated cylinder, and said positioning into firm contact engagement is effected by applying fluid at pressure into the cylinders to clamp said contacted longitudinal member between the copper alloy blocks.

3. A method according to claim 2 wherein said end bar length exceeds said grating width, and further comprising docking the overlapping ends from the end bar after all said resistance welds have been effected.

4. A method according to claim 1 wherein said second electrode is on a member hinged to said second frame, said second frame also carrying a fluid actuated welding cylinder, a low inertia pressure transmitter, and links interconnecting the hinged member, pressure transmitter and welding cylinder, and said driving of the second electrode is effected by introducing fluid under pressure into the welding cylinder, and transmitting the cylinder motion through the pressure transmitter, links and hinged member to the electrode.

5. A method according to claim 4 wherein said hinged electrode member is a bell crank and said pressure transmitter an air bag, and said firm welding contact between the second electrode and end bar is maintained during said collapse of weld metal by resiliently deflecting the air bag.

6. A method according to claim 1 further comprising positioning an end bar locating member in a position which locates one end of the end bar adjacent the clamped end of an outermost said longitudinal member and further locating the other end of the end bar adjacent said first welding locality before effecting the first said resistance weld, and retracting the end bar locating member after at least two said resistance welds have been effected.

7. A method according to claim 6 wherein the end bar is located near each successive welding locality between rollers carried on said second frame.

8. A method of progressively welding a transverse end bar to the aligned ends of longitudinal members of a metal grating, wherein the transverse end bar includes two welding beads protruding from one surface thereof, comprising the steps of
   a. clamping the longitudinal members near one end of the grating against a grating support surface on a first frame,
   b. positioning the end bar adjacent the clamped ends of the longitudinal members with the welding beads protruding towards such members,
   c. clamping opposed portions of a first electrode into firm contact engagement with one of said longitudinal members near its clamped end at a first welding locality,
   d. driving a second electrode against a localized area of the end bar to force it into firm welding contact with the end of said one contacted longitudinal member and maintaining such driving force, said electrodes and a transformer being carried on a second frame,
   e. providing equal impedance means in the connections of the electrodes to the secondary terminals of said transformer,
   f. energizing said transformer to effect resistance welds between the end of that said one contacted member only and said welding beads of said end bar, while at the same time collapsing the weld metal of said beads by the driving action,
   g. releasing the electrodes respectively from engagement with the then welded longitudinal member and end bar, and
   h. effecting relative movement between said frames to position the electrodes at a second welding locality, similarly effecting a resistance weld at the second welding locality and straightening any bend in the end bar caused by collapse of the weld metal during the previous weld by the driving action, and repeating until all welds have been effected, by welding the end bar to the longitudinal members one at a time.

9. A method according to claim 8 further comprising sensing the pressure of the second electrode against the end bar with a load cell which initiates said energising of said transformer to effect the resistance weld.

10. A method according to claim 8 further comprising positioning a plurality of stop bars in a grating locating position, locating the ends to be welded of said longitudinal members against said stop bars before said clamping thereof, and retracting said stop bars after said clamping.

11. A method according to claim 8 wherein said second frame is positioned for controlled driven movement parallel to said end bar to successive localities, the method comprising terminating each said movement by sensing the position of the second frame and controlling the drive means by the sensing action.

* * * * *